United States Patent [19]
Bell

[11] Patent Number: 4,549,290
[45] Date of Patent: Oct. 22, 1985

[54] VOICE/DATA DIGITAL, DUPLEX LINK

[76] Inventor: David B. Bell, 1098 Saint Joseph Ave., Los Altos, Calif. 94022

[21] Appl. No.: 503,033

[22] Filed: Jun. 10, 1983

[51] Int. Cl.[4] .......................... H04B 3/20; H04M 9/08
[52] U.S. Cl. ..................................... 370/32; 179/170.2
[58] Field of Search ........................... 179/170.2, 170.6; 370/24, 27, 29, 32

[56]  References Cited
U.S. PATENT DOCUMENTS 3,896,273  7/1975  Fariello ............................. 179/170.2
4,113,997  9/1978  Horna ............................... 179/170.2
4,213,014  7/1980  Luder ............................... 179/170.6

FOREIGN PATENT DOCUMENTS 2452215  11/1980  France ............................. 179/170.6

Primary Examiner—Joseph A. Orsino, Jr.

[57] ABSTRACT

A full duplex link for sending and receiving digital voice/data signals over a line pair and which incorporates a sample and hold circuit in the receiving portion of the link which is triggered by each change of state of the transmitted signal from the link so that transients resulting from such transmitted signals will not interfere with signals received by the link over the line pair.

10 Claims, 2 Drawing Figures

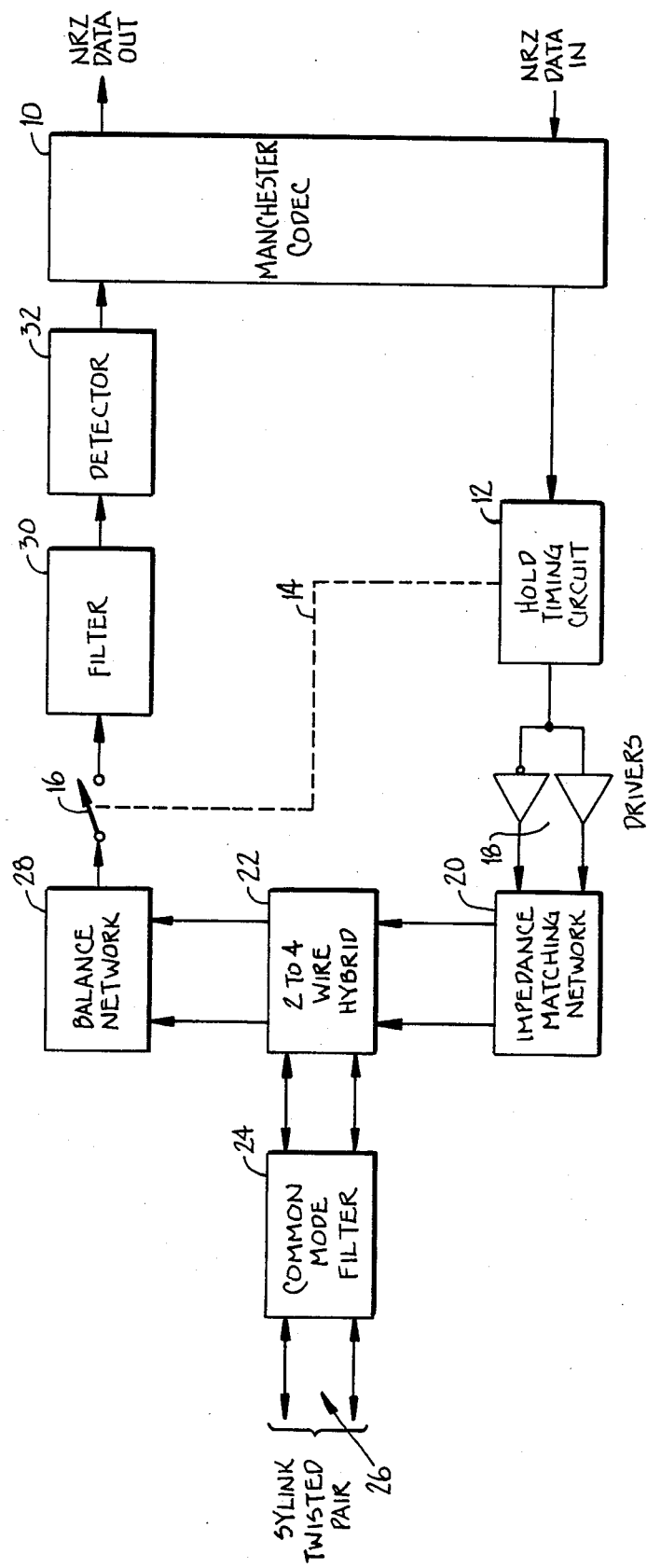
FIG._1.

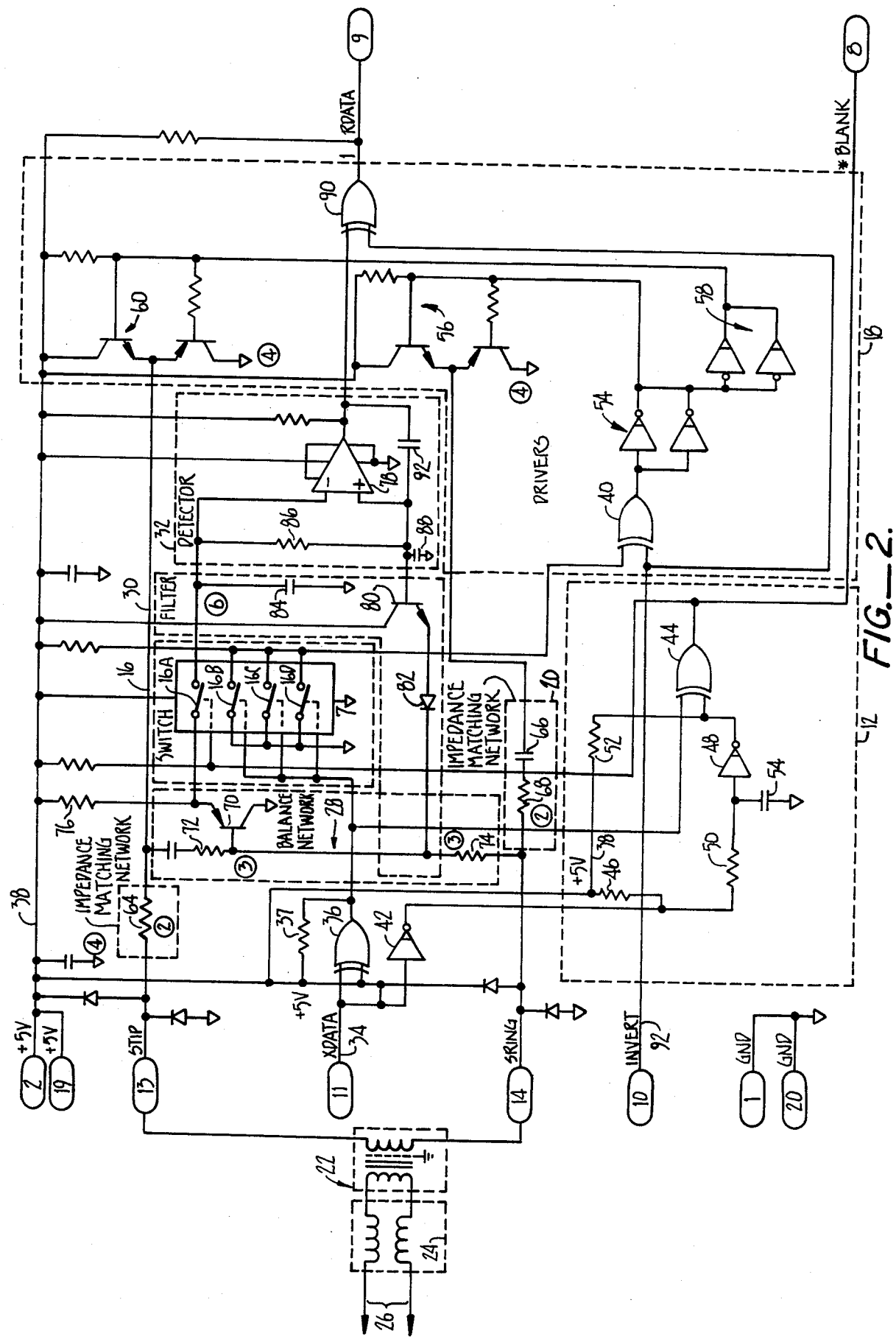

VOICE/DATA DIGITAL, DUPLEX LINK

DESCRIPTION

1. Technical Field

This invention relates to a digital link for use in connecting a voice/data terminal or computer to a telephone system and, more particularly, to a high-speed digital link for communicating voice and data from a work station to a pair of telephone wires.

2. Background Art

In modern private branch telephone exchanges, it is often desirable to be able to transmit and receive both voice and data over an ordinary pair of telephone wires. It is particularly desirable to be able to transmit and receive such data simultaneously, i.e. "full duplex" service. A problem arises in that for a high-speed communication circuit transmitted data will often somehow be fed back into the receiving circuit at the same work station, thereby disrupting full duplex service. While there is circuitry available to overcome this disadvantage, such circuitry greatly reduces the bandwidth at which the work station can transmit and receive data.

What is needed is a circuit which will allow full duplex voice/data digital communications at a relatively high bandwidth.

DISCLOSURE OF INVENTION

The above and other problems of prior art full duplex digital links are overcome by the present invention of a circuit for simultaneously sending and receiving non-return to zero (NRZ) data over a pair of communication wires which circuit is comprised of a transmitting circuit and a receiving circuit.

The transmitting circuit comprises a Manchester data encoding means, hold timing circuit means which is supplied with encoded data for generating a sample and hold circuit control signal at selected times when the encoded data is present, namely at each edge of the encoded data wave form, and two to four wire hybrid means for coupling the transmitting circuit and the receiving circuit to the pair of communication wires.

The receiving circuit comprises a balance network for receiving the encoded data transmitted over the communication wires from the two to four wire hybrid means and for screening out the signal simultaneously transmitted by the transmitting circuit. Sample and hold means are also included in the receiving circuit which are responsive to the sample and hold control signal. The sample and hold means momentarily samples and holds the received signal at each edge of a transmission pulse from the transmitting circuit. In this way, transient signals produced by the transmitting circuit are ignored by the receiving circuit.

The sample and hold means momentarily store the output from the balance network for the duration of the sample and hold control signal. Detector means is supplied with the output of the sample and hold circuit and subtracts from this output the average direct current component thereof in order to obtain only the alternating current component. The net difference, i.e. the alternating current component, is supplied to a Manchester data decoder for decoding the difference signal.

It is therefore an object of the present invention to provide a high speed digital, duplex link.

It is yet another object of the invention to provide a high speed duplex link for a telephone line pair which minimizes the link's receipt of transient signals from the link's transmitting circuit.

It is yet another object the invention to provide a digital, full duplex link capable of transmission of 320 kilobits per second.

It is yet a further object of the invention to provide a voice/data full duplex link which uses existing pairs of telephone communication wires.

The novel features which are believed to be characteristic of the invention, both as to organization and method of operation, together with further advantages thereof, will be better understood from the following drawings, in which a preferred embodiment of the invention is illustrated by way of example.

BRIEF DESCRIPTION OF DRAWINGS

FIG. 1 is a block diagram of the digital link according to the invention; and

FIG. 2 is a schematic diagram of the circuit depicted in block form in FIG. 1.

BEST MODE FOR CARRYING OUT THE INVENTION

Referring now more particularly to FIG. 1, nonreturn to zero (NRZ) data is received at a Manchester coder/decoder (CODEC) 10 which outputs Manchester encoded NRZ data. Such Manchester coder/decoders are well-known to those skilled in the art and, therefore, will not be described in greater detail. The CODEC, by itself, does not constitute a part of the invention. For an example of a Manchester decoder see U.S. Pat. No. 4,361,895.

The Manchester encoded data is supplied to a hold timing circuit 12 which outputs a sample and hold control signal 14 to an electronic switch 16 in the receiving circuit. This control signal constitutes a pulse having a width of approximately 200 nanoseconds at every edge of the Manchester encoded data stream. The sample and hold pulse is timed to make certain that the signal path is open at the onset of the transient. Thus, each time the encoded data stream changes polarity, for example, the sample and hold control signal pulse is produced. Since the bit rate of the data is between 250,000 bits per second to 320,000 bits per second, that is each bit has a width of approximately 3 microseconds, it will be appreciated that the width of the sample and hold control signal pulse is but a small fraction of the duration of the transmitted data pulses.

The Manchester encoded data stream is supplied from the hold timing circuit through a pair of matched drivers 18 to an impedance matching network 20. The impedance matching network 20 matches the impedance of the transmitting circuit to the telephone twisted pair of lines 26. From the impedance matching network 20, the Manchester encoded signal is supplied to a two to four wire hybrid circuit 22 which interconnects the transmitting circuit and the receiving circuit to a common mode filter 24 connected to the twisted pair 26.

The two to four wire hybrid circuit 22 is actually a combination of the impedance matching network 20 and a balance network 28 which constitutes the input of the receiving circuitry of the link. Together these circuits can detect incoming data while outgoing data is being sent. The hybrid circuit 22 together with the balance network 28 and the impedance matching network 20 act like a directional coupler or bridge whereby the receiving circuit will, with the exception of certain transient signals to be discussed further on in this description, only "see" data received over the twisted pair 26. The purpose of the common mode filter 24 is to improve the radio frequency interference rejection and other rejection of noise. It is actually a low pass filter for blocking out the common mode component of the received signal.

The balance network 28 selectively blocks out the signal transmitted by the transmitting portion of the link circuitry. The output, that is the received signal from the network, passes through an electronic switch 16 to a filter 30. As mentioned before, the switch 16 is opened upon the occurrence of the sample and hold control signal from the hold and timing circuit 12. Whatever signal was previously being received is simultaneously stored by a filter 30 connected to the output of switch 16. Thus the switch 16 is opened whenever there is an abrupt transition in the output signal waveform to remove any transients which might otherwise pass through the balance network 28 to the receiving circuitry. The filter then maintains the last signal presented during the time the switch is opened. Such transients which are blocked by the switch 16 are believed to be due to voltage spikes caused by leakage inductance in the coupling transformer between the link and the twisted pair of wires 26. The filter output is supplied to a detector 32 which subtracts the average DC component of the voltage from the filter output so that only the AC component of the filter output is supplied from the detector 32 to the Manchester CODEC 10 to be decoded into NRZ data.

Referring now more particularly to FIG. 2, the circuit depicted in FIG. 1 is shown in greater detail. To the extent possible, the blocks depicted in FIG. 1 have been indicated in dashed lines in FIG. 2.

Referring now more particularly to FIG. 2, the circuit elements depicted in FIG. 1 in block diagram form are now shown in schematic form. It will be understood that the depiction in FIG. 1 is to some extent a functional rather than a detailed circuit diagram. Thus some of the blocks denoted in FIG. 1, particularly the two to four wire hybrid 22, the balance network 28, and the impedance matching network 20, somewhat overlap in function and circuitry in FIG. 2.

Encoded data from the Manchester CODEC 10 is received on line 34 for transmission. This data is supplied to one input of an exclusive OR gate 36 whose other input is connected to the plus five volt bias line 38. In this configuration, the exclusive OR 36 acts as an inverting buffer. The output of the exclusive OR gate 36 is supplied to three control inputs of a four pole single throw switch constituting part of the switch 16. The output of the exclusive OR gate 36 is also connected to one input of an exclusive OR gate 44 and, through a resistor 37, to the bias line 38. The switch 16 is a CMOS switch. The pole terminals 16b, 16c, and 16d of the three switches controlled by the exclusive OR gate 36 are connected to the circuit ground and the throw terminals are connected together to the input of a second exlusive OR gate 40.

The input line 34 is also connected to the input of an inverter 42 whose output is connected through a resistor 50 to the input of an inverter 48. The output of the inverter 48 is connected to the other input of the exclusive OR gate 44 and, through a resistor 52, to the bias line 38. The output of the inverter 42 is also connected through a resistor 46 to the line 38. The input of the inverter 48 is also connected through a capacitor 54 to the circuit ground. The output of the exclusive OR gate 44 is connected to the controlling input lead of a single pole single throw switch 16a which is part of the switch 16.

The purpose of the combination of the inverter 48, the resistor 50, and the capacitor 54 is to act as a time delay such that whenever the transmit signal received over the line 34, and input to one of the inputs of the exclusive OR gate 44, changes state, an output low pulse will be produced from the exclusive OR gate 44. This low output control pulse from the exclusive OR gate 44 will cause the switch 16A to open, thereby blocking the receipt of any transient signals in the receiving portion of the circuit. The switch will remain open for the time width of this control pulse which is determined by the time constant of the circuit composed of the elements 50 and 54.

The transmit signal is passed through the output of the exclusive OR gate 36 and the switches 16B, 16C and 16D to the input of the exclusive OR gate 40. The reason that the transmit signals must pass through the switches 16B, 16C and 16D is to ensure the synchronization of the opening of the switch 16A with the changing of state of the transmitting pulse. Any delay in the opening of the switch 16A will be equalized by a similar delay in the opening of switches 16B, 16C and 16D in the transmitting portion of the circuit.

The output of the exclusive OR gate 40 will correspond to the transmitted data and is supplied to the input of two inverters 54 connected in parallel to drive a first output amplifier 56 and through a second set of parallel connected inverters 58 to a second output amplifier 60. The output amplifiers 56 and 60 are connected in push-pull fashion. The output of the amplifier 60 is connected to one side of the secondary winding of the transformer 22 through a resistor 64 which forms part of the impedance matching network 20. The output of the amplifier 56 is connected to the other side of the secondary winding of the transformer 22 through a series connection of a capacitor 66 in series with a resistor 68. The combination of the capacitor 66 and the resistor 68 form the remaining portion of the impedance matching network 20.

The balance network 28 is comprised of a pair of resistors 72 and 74 and a PNP transistor 70. The resistances 72 and 74 are connected in series to the output of the amplifier 60 and, through the series connection of the resistor 68 and the capacitor 66, to the output of the amplifier 56. The ratio of the values of the resistances 72 and 74 to each other determines the balance network's ability to reject signals being transmitted from the amplifiers 56 and 60 and to only receive signals passing over the common pair 26. The junction point of the resistors 72 and 74 is connected to the base of the transistor 70 whose emitter is connected to the pole terminal of switch 16A and is also connected through a suitable biasing resistor 76 to the bias line 38.

The throw terminal of switch 16A is connected to the inverting input of a comparator 78. The non-inverting input of the comparator 78 is connected to the base of an NPN transistor 80. The collector of the transistor 80 is connected to the bias line 38 and the emitter of the transistor 80 is connected to the anode of a diode 82 whose cathode is connected to the base of the transistor 70. A capacitor 84 is connected from the circuit ground to the inverting input of comparator 78. A resistor 86 is connected in parallel between the inverting and the non-inverting inputs of the comparator 78. The non-inverting input of the comparator 78 is connected through a capacitor 88 to the circuit ground and through a capacitor 92 to the output of comparator 78. This latter capacitor adds hysteresis and provides a clean fast edge to the output signal. The transistor 80, the capacitor 84 and the diode 82 together make up the filter circuit 30. The resistor 86, the comparator 78 and the capacitors 88 and 92 together make up the detector circuit 32.

In operation, the transistor 80, in conjunction with the diode 82, clamps the negative excursion of the transient signal appearing at the input to transistor 70. The capacitor 88 takes the average DC value of the output from the switch 16A and this is effectively subtracted from the output of the switch 16A by the comparator 78 to give only the alternating current component of the signal as the output of the comparator 78.

This difference signal output is fed to one input of an exclusive OR gate 90, whose output in turn is supplied to the Manchester CODEC 10. The capacitor 88 also stores the last signal received from the switch 16A whenever it is opened as the transmit signal changes state. This stored signal then becomes the momentary output of the comparator 78.

The purpose of the invert line 92 which is connected to the other inputs of the exlusive OR gates 40 and 90 is to allow the link to be connected either the tip or the ring or the ring or the tip connections of the common pair 26. When the system is first put into operation, a test pulse is supplied over the pair from, or to, the link to determine the proper phasing. The invert line is then either supplied or is not supported with a voltage so that the phasing of the signal will be the same as the other links attached to the line pairs of the system.

The terms and expressions which have been employed here are used as terms of description and not of limitation and there is no intention, in the use of such terms and expressions, of excluding equivalents of the features shown and described, or portions thereof, it being recognized that various modifications are possible within the scope of the invention as claimed.

What is claimed is:

1. Link apparatus connected to one end of a pair of communication lines for simultaneously sending and receiving digital data over the lines, the link apparatus comprising:
   a transmitting circuit for generating digital signal pulses and for transmitting them over the pair of communication lines and including means for detecting each change of state of said digital signal pulses and for generating a control signal pulse at each such change of state,
   a receiving circuit for receiving data signals generated by an external source and transmitted over the communication lines to the link apparatus, the receiving circuit comprising means for discriminating between data signals received over the communication lines and the digital signal pulses generated by the transmitting circuit and for outputting said data signals, controllable switch means supplied with the control signal pulse for interrupting the outputting of said data signals by the discriminating means in response to the control pulse, and storage means for storing the value of the last received data signal from the external source prior to the interruption by the switch means, and wherein the switch means is connected in series between the discriminating means and the storage means.

2. Link apparatus as recited in claim 1 wherein the control pulse has a predetermined duration and wherein the switch means interrupts the received data signal only for the duration of the control pulse.

3. Link apparatus as recited in claim 2 wherein the duration of the control pulse does not exceed 250 nanoseconds.

4. Link apparatus as recited in claim 1 further comprising means for removing the direct current component of the received data signal.

5. Link apparatus as recited in claim 1 further comprising a Manchester coder/decoder connected to the transmitting and receiving circuits for encoding data for transmission by the transmitting circuit and for decoding data signals received by the receiving circuit.

6. Link apparatus for simultaneously sending and receiving coded data over a pair of communication lines, the apparatus being comprised of a transmitting circuit and a receiving circuit, and wherein the
   transmitting circuit includes data encoding means, hold timing circuit means, supplied with the encoded data to be transmitted, for generating a storage control signal at selected times when encoded data is present, means for coupling the transmitting circuit and the receiving circuit to the pair of communication lines and wherein
   the receiving circuit includes balance network means for receiving encoded data from the pair of communication lines and for screening out signals transmitted by the transmitting circuit, storage means responsive to the storage control signal for storing the signal screened by the balance network for the duration of said control signal, detector means for taking the difference of the output of the storage means and the average direct current component thereof, and data decoder means for decoding said difference.

7. Link apparatus as recited in claim 6 wherein the hold timing circuit means generates a storage control signal at every edge of the encoded data waveform.

8. Apparatus as recited in claim 6 wherein the duration of said storage control signal does not exceed 250 nanoseconds.

9. Link apparatus as recited in claim 6 further comprising means for ensuring coincidence between the operation of the storage means and the change of state of the transmission signal.

10. Link apparatus as recited in claims 1, 5 or 6 wherein the transmitted and received data represents, in part, voice data.

* * * * *